United States Patent [19]
Fleck

[11] Patent Number: 4,796,117
[45] Date of Patent: Jan. 3, 1989

[54] RECORDING AND/OR REPRODUCING APPARATUS

[75] Inventor: Harald Fleck, Schwechat, Austria

[73] Assignee: U.S. Philips Corporation, New York, N.Y.

[21] Appl. No.: 18,098

[22] Filed: Feb. 20, 1987

[30] Foreign Application Priority Data

Feb. 24, 1986 [AT] Austria .................................. 473/86

[51] Int. Cl.⁴ .......................................... G11B 15/00
[52] U.S. Cl. ................................................. 360/96.5
[58] Field of Search ................................ 360/96.5, 85; 242/197–200

[56] References Cited

U.S. PATENT DOCUMENTS 4,628,383 12/1986 Miyamoto ......................... 360/96.5

Primary Examiner—A. J. Heinz
Attorney, Agent, or Firm—F. Brice Faller

[57] ABSTRACT

A recording and/or reproducing apparatus (1) for a record carrier (16) in the form of a tape arranged in a cassette (2) provided with a shutter (18) includes a cassette holder (21), which is movable along an L-shaped path from a loading position into an operating position to bring the cassette (2) into an operating position, and a lever (43) for opening the shutter (18) of the cassette (2) when the cassette is brought into its operating position. The cassette holder (21) has an actuating element (49) and the lever (43) has a stop (52) which projects into the L-shaped path of the actuating element (49), so that the lever (43) can be actuated by the cassette holder (21) to open the shutter (18).

1 Claim, 2 Drawing Sheets

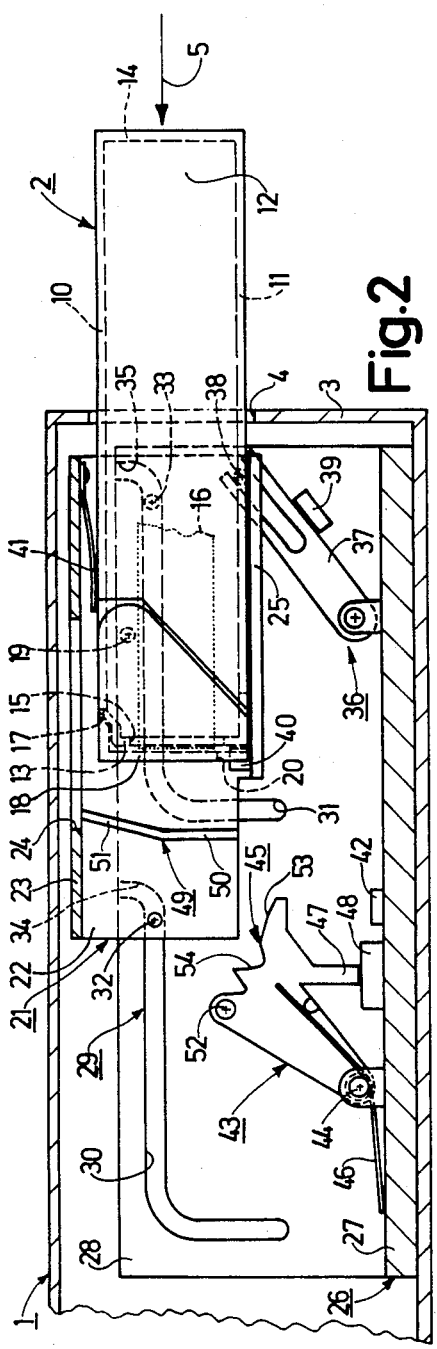
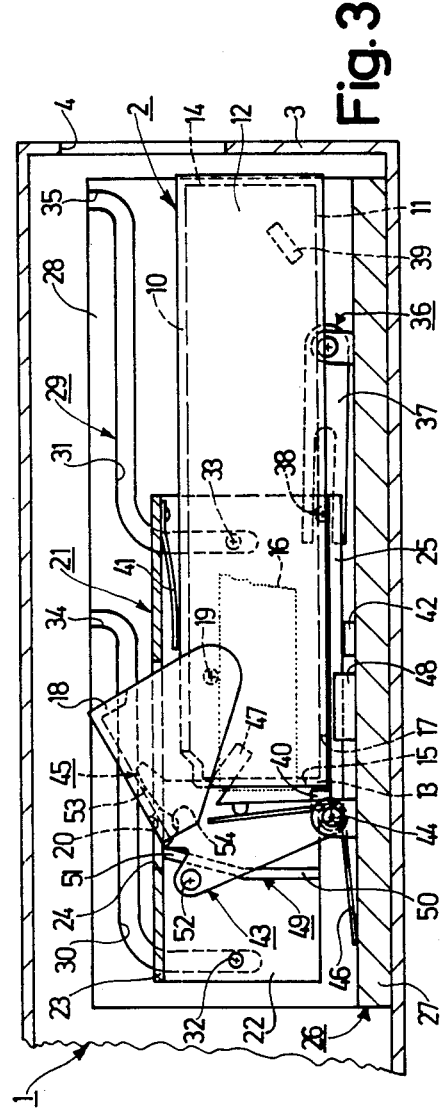

RECORDING AND/OR REPRODUCING APPARATUS

The invention relates to a recording and/or reproducing apparatus for a tape arranged in a rectangular cassette having two main walls, four side walls and a shutter for closing a side wall formed with at least one opening, which shutter is pivotable about a pivotal axis and is movable from a closed position to an open position against spring force. The apparatus comprises a chassis and a cassette holder which is movable relative to the chassis, which holder is movable along a substantially L-shaped path from a loading position to an operating position. A lever is mounted on the chassis so as to be pivotable about a pivotal axis parallel to the pivotal axis of the shutter and which is movable from a rest position into an operating position, for opening the shutter. The lever comprises an actuating surface which is adapted to cooperate with the shutter and which during the movement of the cassette into its operating position, while the lever is being moved from its rest position into its operating position, sets the shutter from its closed position to its open position.

In a commercially available apparatus of this type the lever is pivoted by the cassette shutter to be opened, the entire actuating surface of the lever being constructed as an inclined surface which rises from the closed position towards the open position of the shutter and which by its engagement with the shutter causes the shutter to be opened when the cassette is moved into its operating position. The actuating movement of the shutter is partly obtained when the cassette is moved parallel to its main walls and the remainder of the actuating movement of the shutter is obtained when the cassette is moved perpendicularly to its main walls. In order to minimise the displacement of the cassette and the cassette holder in a direction perpendicular to the main walls, which is necessary to minimise the height of the apparatus, the shutter must already be opened a far as possible during the movement of the cassette parallel to its main walls, because the remainder of the actuating movement of the shutter can then be minimal and can be obtained with a minimal displacement. In order to achieve this the actuating surface of the lever in the known apparatus has a comparatively steep inclination. However, such a steep inclination of the actuating surface results in comparatively large reactive forces being exerted on the cassette via the shutter, which forces act in directions opposite to the direction of insertion of the cassette in the cassette holder. If the cassette is retained in its insertion position by spring force only, these reactive forces may result in the cassette being moved out of its insertion position inside the cassette holder, so that the cassette cannot be brought into its operating position in the approrpiate aanner and consequently the correct operation is disturbed. Further, the inclination of such a steeply inclined actuating surface is limited, because otherwise friction can cause self-locking between the actuating surface and the shutter during the displacement of the cassette parallel to its main walls. In the case of self-locking the shutter is blocked in its closed position, which obviously inhibits normal operation. In order to preclude this, the inclination of the actuating surface should remain within predetermined limits. However, this limits the attainable actuating movement of the shutter during the movement of the cassette parallel to its main walls, which is in conflict with a minimal displacement of the cassette and the cassette holder in a direction perpendicular to the main walls and hence with a minimal height of the apparatus.

SUMMARY OF THE INVENTION

It is the object of the invention to mitigate the above problems and to provide an apparatus having a minimal height in which during the movement of the cassette parallel to its main walls substantially no reactive forces which are directed oppositely to the direction of insertion of the cassette into the cassette holder are exerted on the cassette and in which the occurrence of self-locking between the actuating surface and the shutter is precluded. To this end the cassette holder comprises an actuating element and the lever comprises a stop which projects into the substantially L-shaped path of the movement of the actuating element, via which stop the actuating element of the cassette holder moves the lever from its rest position towards its operating position when the holder is moved from its loading position to its operating position, the actuating surface of the lever moving the shutter from its closed position towards its open position.

In this way the lever can be actuated by the cassette holder to move it from its rest position to its operating position. By a suitable choice of the transmission ratio, i.e. the distance between the stop of the lever and the pivotal axis of this lever, it is possible to obtain a larger displacement range for the lever and, consequently, for the actuating surface during the movement of the cassette holder parallel to the main walls of the cassette. This enables the shutter, which is actuated via the actuating surface, to be opened already to a maximum extent duiing the movement of the cassette parallel to its main walls, so that the desired result can be obtained with a shorter displacement for the cassette and the cassette holder in a direction perpendicular to the main walls of the cassette, thereby enabling the height of the apparatus to be minimised. Further, the actuating surface can be given such a shape that there is no risk of self-locking between the actuating surface and the shutter and that no reactive force directed oppositely to the direction of insertion of the cassette into the cassette holder is exerted on the cassette via this actuating surface. This ensures that the cassette also remains in its inserted position in the cassette holder if it is retained in this position by spring force only and can thus be brought into its operating position without any problems.

U.S. Pat. No. 4,050,087 describes an apparatus comprising a cassette holder which can be swung out of the apparatus by a pivotal movement about an axis and which is not movable inside the apparatus along an L-shaped path. This apparatus is of a completely different type in which the displacement of the cassette holder determines the free space required outside the apparatus. Moreover, in this known apparatus the pivotal axis of a lever for opening the cassette shutter extends perpendicularly instead of parallel to the pivotal axis of the shutter and this lever for opening the shutter is coupled to the cassette holder via coupling and guide members in such a way that during the movement of the cassette holder into its operating position the lever is pivoted so as to open the cassette shutter. As the coupling and guide members constantly engage with each other and also perform a guiding function in addition to their coupling function, their construction and arrangement relative to each other must comply with comparatively stringent requirements in order to guarantee a correct coupling and guidance. In the apparatus in accordance with the invention, however, the cooperation between the cassette holder and the lever to open the shutter of a cassette is achieved simply with the aid of only one actuating element on the cassette holder and a stop which is provided on the lever and which projects into the path of movement of this actuating element, which elements do not perform any additional guiding function and whose construction and whose arrangement relative to each other is relatively non-critical and very simple.

From GB-A-2137796, to which U.S. Pat. No. 4,628,383 corresponds, an apparatus is known in which a cassette holder which is movable along an L-shaped path of movement includes an actuating element. During movement of the cassette holder from its loading position into its operating position, the element moves a stop on a lever for opening the cassette shutter can be moved in such a way that the cassette shutter is opened via an actuating surface of the lever. However, in this known apparatus the stop on the lever is moved by the actuating element via an additional intermediate lever. The movement of the lever for opening the shutter is not performed until the cassette holder moves perpendicularly to the main walls of the cassette, so that the lever does not subject the cassette to any reactive forces directed oppositely to the direction of insertion via the shutter. A comparatively large displacement of the cassette and the cassette holder in a direction perpendicular to the main walls is required for completely opening the shutter, which is in conflict with the requirement to minimise the height of the apparatus. In the apparatus in accordance with the invention, however, the actuating element on the cassette holder cooperates directly with the stop on the lever, so that additional intermediate elements may be dispensed with. The lever for opening the shutter is moved during the movement of the cassette holder parallel to the main walls of the cassette so that the shutter is almost open and the shutter can be opened completely with a short displacement of the cassette and the cassette holder in a direction perpendicular to the main walls of the cassette, thus enabling the height of the apparatus to be minimised.

BRIEF DESCRIPTION OF THE DRAWINGS

FIG. 2 is a partial section view of the apparatus with the cassette holder in its reading position;

FIG. 3 is partial section view of the apparatus with the cassette holder in its operating position;

DETAILED DESCRIPTION OF THE PREFERRED EMBODIMENTS

Figure 1:
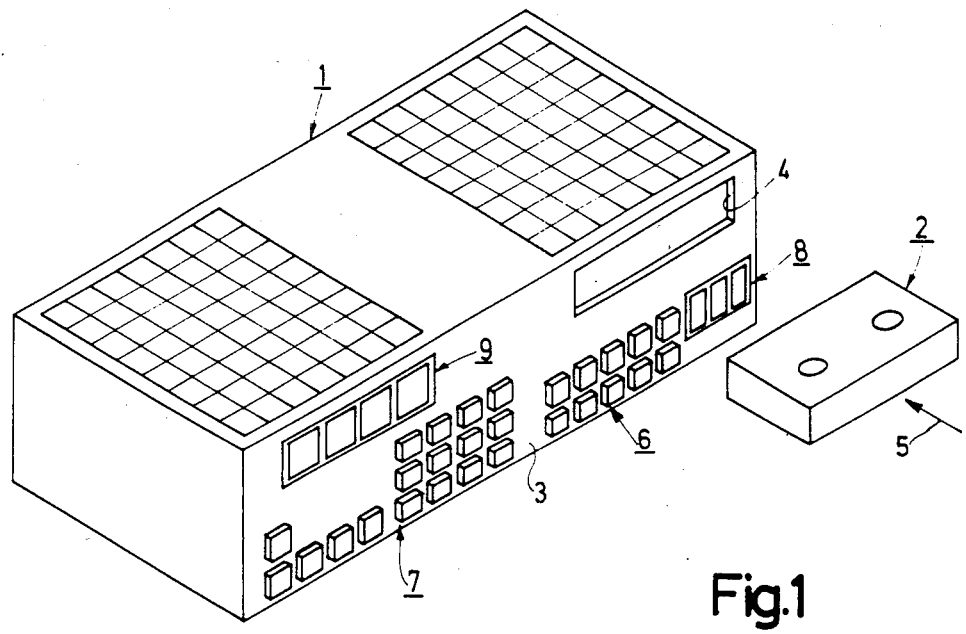
FIG. 1 is a diagrammatic perspective of the apparatus.

FIG. 1 shows a recording and reproducing apparaus 1 intended for recording and reproducing video signals and audio signals on/from a magnetisable record carrier in the form of a tape, briefly referred to hereinafter as "magnetic tape". The magnetic tape is contained in a rectangular cassette 2, shown schematically in FIG. 1, which cassette contains two juxtaposed reel hubs between which the magnetic tape extends and can be inserted by hand into the apparatus 1 through an opening 4 in the front wall 3 of the housing of the apparatus in the direction indicated by the arrow 5. When the cassette 2 is inserted into the apparatus, it is slid into a movable cassette holder whose construction will be described in detail hereinafter with reference to FIGS. 2 and 3. By means of this cassette holder the cassette, after it has been inserted completely into the apparatus, is brought into an operating position shown schematically in FIG. 2, initially parallel and subsequently perpendicularly to the main walls of the cassette. For selecting the modes of operation of the apparatus, such as "recording", "normal forward reproduction", "normal reverse reproduction", "fast forward", "fast reverse", "still reproduction" etc., the apparatus 1 comprises a first set 6 of keys on the front panel 3. For programming the apparatus and for entering further data, for example setting a daytime clock, the apparatus 1 comprises a second set 7 of keys on the front panel 3. Further, the front panel 3 of the apparauus 1 is equipped with two display units 8 and 9 whose display elements comprise, for example, seven segments each and which serve, for example, for displaying the counter positions of a tape-length counter and for daytime display.

The cassette 2 is of a generally known type, for which reason only those parts are shown schematically which are relevant to the present invention. The cassette 2 comprises two main walls 10 and 11, two short side walls 12, of which only one wall is visible in FIGS. 2 and 3, and two long side walls 13 and 14. The long side wall 13 has two openings 15 through which the magnetic tape 16, shown in dotted lines, is led out of the interior of the cassette, and a further opening 17 which continues in the main walls 10 and 11 and which can be used to provide access to a cassette-shutter opener. For covering the long side wall 13 with the openings 15 and 17 and the magnetic tape 16, which extends along this side wall, the cassette 2 comprises a shutter 18 which is pivotable against spring force about a pivotal axis 19 perpendicular to the short side walls 12 from a closed position shown in FIG. 2, in which it can be latched by means of a disengageable latching device, into an open position shown in FIG. 3. Said spring force is provided by a spring arranged in the cassette. For the sake of simplicity this spring and the latching device are not shown in FIGS. 2 and 3. At its end which faces the lower main wall 11 the shutter 18 has two openings 20 through which limiting stops can cooperate with the long side wall 13 when the cassette is inserted into the cassette holder.

Referring to FIGS. 2 and 3, the cassette holder 21 is substantially channel-shaped and comprises two side walls 22, of which only one wall is visible in FIGS. 2 and 3, and an upper wall 23 which interconnects the two side walls and which is formed with an opening 24, and two bottom wall portions 25 which face each other and which are inclined relative to the side walls, only one of said bottom wall portions being visible in FIGS. 2 and 3.

The cassette holder 21 is movable relative to a chassis 26 of the apparatus 1, which chassis comprises a deck plate 27 and two side plates 28 which extend at right angles to the deck plate, only one of said side plates being visible in FIGS. 3 and 3. The cassette holder 21 is movable along an L-shaped path from a loading position shown in FIG. 2 into an operating position shown in FIG. 3, initially parallel to the main walls 10 and 11 of the cassette 2 and subsequently perpendicularly to the main walls 10 and 11 of the cassette. For guiding the cassette holder 21 along this L-shaped path of movements a guide means 29 is arranged between the cassette holder and the two side plates 28 of the chassis 26. The guide means 29 comprises two L-shaped guide slots 30 and 31, and in each side plate 28, which define the L-shaped path of movemnnt. Further, the guide means 29 comprises two guide pins 32 and 33 on each side wall 22 of the cassette holder 21, the free ends of the pins engaging the guide slots 30 and 31. In order to enable the guide pins 32 and 33 of the cassette holder 21 to be simply introduced into the guide slots 30 and 31 when this holder is mounted in the apparatus, the guide slots each have an offset portion 34 and 35 at the end facing the front wall 3, which offset portions extend up to the ends of the side plates 28 and in whose open ends the guide pins 32 and 33 can be simply inserted from above when the cassette holder 21 is mounted.

For actuating the cassette holder 21 in order to move it from its loading position into its operating position and vice versa there is provided an actuating device 36, comprising an actuating lever 37 which is pivotally mounted on the deck plate 27 of the chassis 26. The bifurcate end portion of the actuating lever 37 engages around a pin 38 which projects from the side wall 22 of the cassette holder 21 and which is visible in FIGS. 2 and 3, to provide the coupling with the cassette holder 21. When the cassette holder 21 is in its loading position the actuating lever 37 abuts against a stop 39 which projects from the side plate 28 visible in FIGS. 2 and 3, to define the loading position of the cassette holder 21. The actuating lever 37 can be driven by means of a gearwheel mechanism, a worm gear or a drive wheel formed with a cam surface in conjunction with a lever system which can be driven by the wheel, but this is not shown because the manner in which the cassette holder is actuated is not relevant to the present invention.

As can be seen in FIG. 2, when the cassette holder 21 is in its loading position, a cassette 2 can be inserted by hand into the cassette holder in a predetermined insertion position with its shutter 18 facing forwards. The insertion position is defined by two limiting stops 40 which project from the bottom-wall portions 25 towards the upper wall 23 and which, when the cassette 2 is inserted into the cassette holder 21, engage the two openings 20 in the shutter 18, via which openings they cooperate with the long side wall 13 of the cassette 2. The cassette 2 is retained in this insertion position by means of two blade springs 41 secured to the upper wall 23, which press against the upper main wall 10 of the cassette 2 and thus urge the cassette against the two bottom wall portions 25.

In the operating position of the cassette holder 21, which position is defined in that its bottom wall portions 25 abut against two positioning stops 42 which project from the deck plate 27 of the chassis 26, the cassette 2 also occupies its operating position. In this position the cassette 2 is supported by positioning stops, not shown, against which it is urged by the springs 41, in such a way that it has a slight clearance with respect to the bottom wall portions 25 of the cassette holder 21. In this operating position two rotatable winding spindles of the apparatus cooperate with the reel hubs in the cassette. The magnetic tape is then retracted from the cassette by means of a tape-guide device and is wrapped around a drum-shaped scanning device having rotatable magnetic heads for recording or reproducing television signals in/from tracks which are inclined relative to the longitudinal direction of the magnetic tape, and it cooperates with further tape guides, magnetic heads and a capstan. After this, a recording or reproducing process or another mode of operation can be carried out. Since the above devices are not relevant to the present invention, they are not shown for the sake of simplicity.

In order to permit withdrawal of the magnetic tape 16 from the cassette 2 it is obvious that the shutter 18 must be opened previously. For this purpose there is povided a lever 43 which is pivotally mounted on the deck plate 27 of the chassis 26 and which has a pivotal axis 44 which extends parallel to the pivotal axis 19 of the shutter 18, which lever is movable from a rest position shown in FIG. 2 to an operating position shown in FIG. 3. For its cooperation with the shutter 18 the lever has an actuating surface 45 which during the movement of the cassette 2 to its operating position, while the lever 43 is being pivoted from its rest position to its operating position, engages the shutter 18 and moves it from its closed position to its open position. The lever 43 for opening the shutter 18 is loaded by a leg spring 46 which tends to retain the lever 43 in its rest position in which a projection 47 of the lever 43 abuts against a positioning stop 48 on the deck plate 27.

As is apparent from FIGS. 2 and 3, the cassette holder 21 comprises an actuating element which is constituted by a rib 49 which projects from the side wall 22 of the cassette holder 21, which is visible in FIGS. 2 and 3, towards the side wall which is not visible in FIGS. 2 and 3. The rib 49 has a first rib portion 50 which extends perpendicularly to the main walls 10 and 11 of the cassette 2 and a second rib portion 51 which is inclined relative to the first rib portion. The lever 43 carries a stop which projects into the L-shaped path of movement of the rib 49, which stop is constituted by a pin 52 mounted on the lever 43. In this way it is achieved in that the lever 43 can be actuated by the cassette holder. Obviously, the pin 52 and the lever 43 may be made in one piece from a plastics. Alternatively, the actuating element may be constituted by a pin which projects from the cassette holder and the stop on the lever may be constituted by a projecting rib which is laterally offset from this lever. Moreover, the actuating element may be constituted by a slot which is closed at both ends and which is formed in a side wall of the cassette holder, which slot is engaged by a stop pin which projects from the lever, the lever being moved in both directions by the cassette holder, so that a spring for loading the lever may be dispensed with. During a part of its movement, namely during its movement parallel to the main walls 10 and 11 of the cassette, the rib 49 cooperates with the pin 52. The rib 49 on the cassette holder 21 then moves the lever 43 from its rest position shown in FIG. 2 towards its operating position when the cassette holder is moved from its loading position to its operating position, the actuating surface 45 of the lever 43 moving the shutter 18 from its closed position towards its open position against the spring force.

When the cassette 2 is inserted into the cassette holder 21 a release device arranged in the cassette holder cooperates with the latching device for the shutter 18 and releases the latching device, thus enabling the shutter to be opened. If the actuating device 36 is activated when the cassette occupies its insertion position defined by the limiting stops 40 after complete insertion of the cassette 2 in the cassette holder 21 the cassette holder 21 is initially moved parallel to the main walls 10 and 11 of the cassette 2 via the actuating lever 37. After a part of this actuating movement the rib 49 abuts against the pin 52, causing the lever 43 to be moved from its rest position towards its operating position by the rib portion 50 against the force of the spring 46. A first portion 53 of the actuating surface 45 then abuts against the lower edge of the shutter 18 and engages beneath this edge, causing the shutter to be moved from its closed position towards its open position against the spring force acting on this shutter. As the cassette holder 21 is moved further parallel to the main walls of the cassette the lever 43 opens the shutter 18 further, the lower edge of this sliding along the first portion 53 of the actuating surface 45 towards a second portion 54 of the actuating surface 45. When the actuating movement of the cassette holder changes to a movement perpendicular to the main walls of the cassette, the lever 43 is no longer pivoted by the rib portion 50 which extends perpendicularly to the main walls of the cassette, the lever 43 then occupying a position in which the lower edge of the shutter already engages with the second portion 54 of the actuating surface 45. As the cassette holder is moved further perpendicularly to the main walls of the cassette, the second portion 54 of the actuating surface 45 engages beneath the lower edge of the shutter 18 and the shutter is further opened against the spring force acting on it as the cassette is lowered into operating positions. After the cassette holder has been lowered completely in a direction perpendicular to the main walls of the cassette, after which the actuating device 36 fo the cassette holder is switched off automatically, the shutter occupies its open position shown in FIG. 3, which position is defined by the position of the spring-loaded lever 43 relative to the shutter 18. The pin 52 of the lever 43 is then clear of the seond rib portion 51 of the rib 49. The projection 47 of the lever 43 then engages the opening 17 in the side wall 13.

Since the lever 43 is actuated by the rib 49 via its pin 52, a suitable choice of the transmission ratio, which depends on the distance between the pin 52 and the pivotal axis 44 of the lever 43 enables a comparatively large pivotal movement for the lever 43 with a comparatively small displacement of the cassette holder 21 parallel to the main walls of the cassette, so that the shutter 18 almost open as far as possible when the cassette holder is moved as far as possible parallel to the main walls of the cassette. As a result of this, the shutter need be pivoted only slightly during the movement of the cassette holder perpendicular to the main walls of the cassette, so that the cassette holder only has to be moved perpendicularly to the main walls of the cassette over a distance necessary for bringing the winding spindles into engagement with the reel hubs, which is advantageous for a minimal height of the apparatus. As is apparent in particular from FIG. 2, the actuating surface 45 has such a shape that it acts on the lower edge of the shutter almost perpendicularly to this edge, so that during the movement of the cassette into its operating position it exerts practically no force directed oppositely to the direction of insertion 5 on the shutter. This ensures that under the force of the spring 41 the cassette 2 is firmly retained in the cassette holder 21 in its insertion position defined by the limiting stops 40. The favourable engagement of the lever 43 with the shutter 18 also precludes the occurrence of self-locking between the lever and the shutter.

When the cassette holder is moved back from its operating position to its loading position the lever 43 which is then pivoted back under the influence of the spring 46 enables the shutter 18 to be moved under the influence of the spring force acting on it, causing the shutter 18 to be returned to its closed position.

Figure 4:
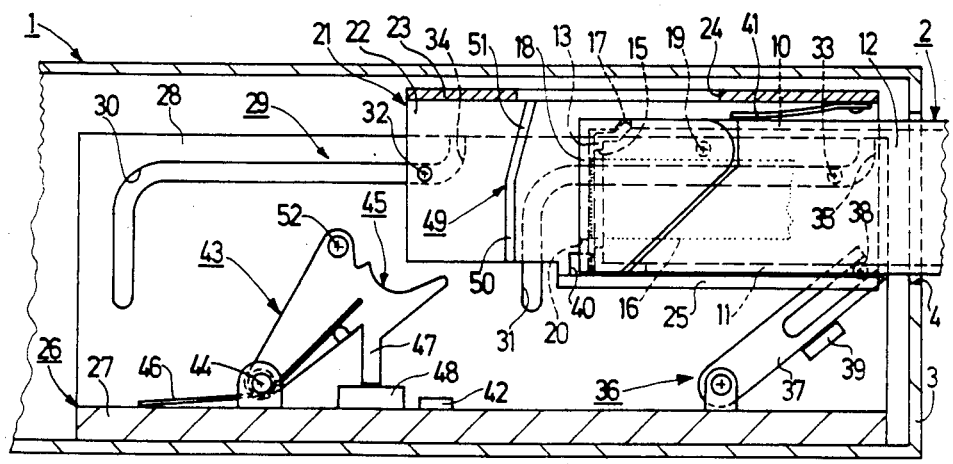
FIG. 4 is a partial section view of a second embodiment with the cassette holder in its loading position.

In the apparatus 1 shown in FIG. 4 the actuating surface 45 of the lever 43 for opening the shutter 18 has a different shape than in the apparatus shown in FIG. 3. In the present case the actuating surface 45 of the lever 43 takes the form of a surface which engages behind the shutter 18 during its movement between its closed position shown in FIG. 4 and its open position, which is not shown. As a result of this the forces exerted on the shutter during its actuation by the actuating surface comprise a component which acts in the direction of insertion 5. This causes the cassette to be drawn against the limiting stops 40 by the lever 43, so that it is very reliably positioned in its insertion position.

Other embodiments are possible within the scope of the invention, in particular with respect to the construction of the actuating element on the cassette holder, the stop on the lever and the actuating surface of the lever. For example, the actuating element may be constiuted by a rib provided on the cassette holder and extending to a point below the bottom wall portions, in which case the stop of the lever may be arranged nearer the pivotal axis of the lever, to obtain a larger transmission ratio. Alternatively, the stop of the lever may also be connected to this lever via a spring-loaded intermediate lever, in such a way that by means of the actuating element the stop is movable with overtravel relative to the lever, in which case the actuating element may remain in engagement with the stop when the lever is in its operating position, without the opening position of the lever being influenced.

What is claimed is:

1. A recording and/or reproducing apparatus for a record carrier in the form of a tape (16) arranged in a rectangular cassette (2) comprising two main walls (10, 11), four side walls (11, 13, 14) and a shutter (18) for closing a side wall (13) formed with at least one opening (15, 17), which shutter is pivotable about a pivotal axis (19) and is movable from a closed position to an open position against spring force, which apparatus comprises a chassis (26) and a cassette holder (21) which is movable relative to the chassis, which holder is movable along a substantially L-shaped path from a loading position, in which a cassette (2) with the shutter (18) facing forwards in a direction of insertion can be inserted by hand into a predetermined insertion position in the cassette holder (21), initially substantially parallel to the main walls (10, 11) of the cassette and subsequently perpendicularly to the main walls (10, 11) of the cassette (2) in an operating position of the holder (21) in which a cassette (2) also occupies an operating position, and comprising a lever (43) which is mounted on the chassis (26) so as to be pivotable about a pivotal axis (44) parallel to the pivotal axis (19) of the shutter (18) and which is movable from a rest position into an operating position, for opening the shutter (18), which lever (43) comprises an actuating surface (45) which is adapted to cooperate with the shutter (18) and which during the movement of the cassette (2) into its operating position while the lever (43) is being pivoted from its rest position into its operating position, engages the shutter (18) and moves it from its closed position to its open position, the cassette holder (21) comprising an actuating element (49) movable with the cassette holder along the L-shaped path, said lever having a stop (52) which projects into the substantially L-shaped path of the movement of the actuating element (49), the actuating element (49) of the cassette holder (21) engaging the stop (52) and pivoting the lever (43) from its rest position towards its operating position when the holder (21) is moved from its loading position to its operating position, the actuating surface (45) of the lever (43) moving the shutter (18) from its closed position towards its open position.

* * * * *